United States Patent
Dornhoefer et al.

(10) Patent No.: US 7,111,822 B2
(45) Date of Patent: Sep. 26, 2006

(54) VALVE FOR CONTROLLING A FLUID

(75) Inventors: Gerd Dornhoefer, Leonberg (DE); Guenther Bantleon, Leonberg (DE); Thanh-Hung Nguyen-Schaefer, Asperg (DE); Martin Moeller, Stuttgart (DE); Thomas Hebner, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/945,733

(22) Filed: Sep. 20, 2004

(65) Prior Publication Data

US 2005/0087714 A1 Apr. 28, 2005

(30) Foreign Application Priority Data

Oct. 2, 2003 (DE) ................................. 103 45 946

(51) Int. Cl.
*F16K 31/02* (2006.01)

(52) U.S. Cl. .................................. 251/355; 251/129.21

(58) Field of Classification Search ............ 251/129.15, 251/129.21, 129.22, 355
See application file for complete search history.

(56) References Cited

U.S. PATENT DOCUMENTS 5,848,613 A * 12/1998 Sakaguchi et al. ..... 137/625.65
6,824,120 B1 * 11/2004 Furuta et al. ............... 251/355

* cited by examiner

*Primary Examiner*—J. Casimer Jacyna
(74) *Attorney, Agent, or Firm*—Kenyon & Kenyon LLP

(57) ABSTRACT

A valve for controlling a fluid, in particular for controlling a gas. The valve includes a valve housing which accommodates an electromagnetic actuating unit for a solenoid armature which is guided axially displaceably in the valve housing and which cooperates with a valve seat via a valve-closing member, so that a fluid stream from an inflow side to an outflow side of the valve is controllable. At least one lubricant chamber adjacent to the guide gap between the valve housing and the solenoid armature is provided.

11 Claims, 3 Drawing Sheets

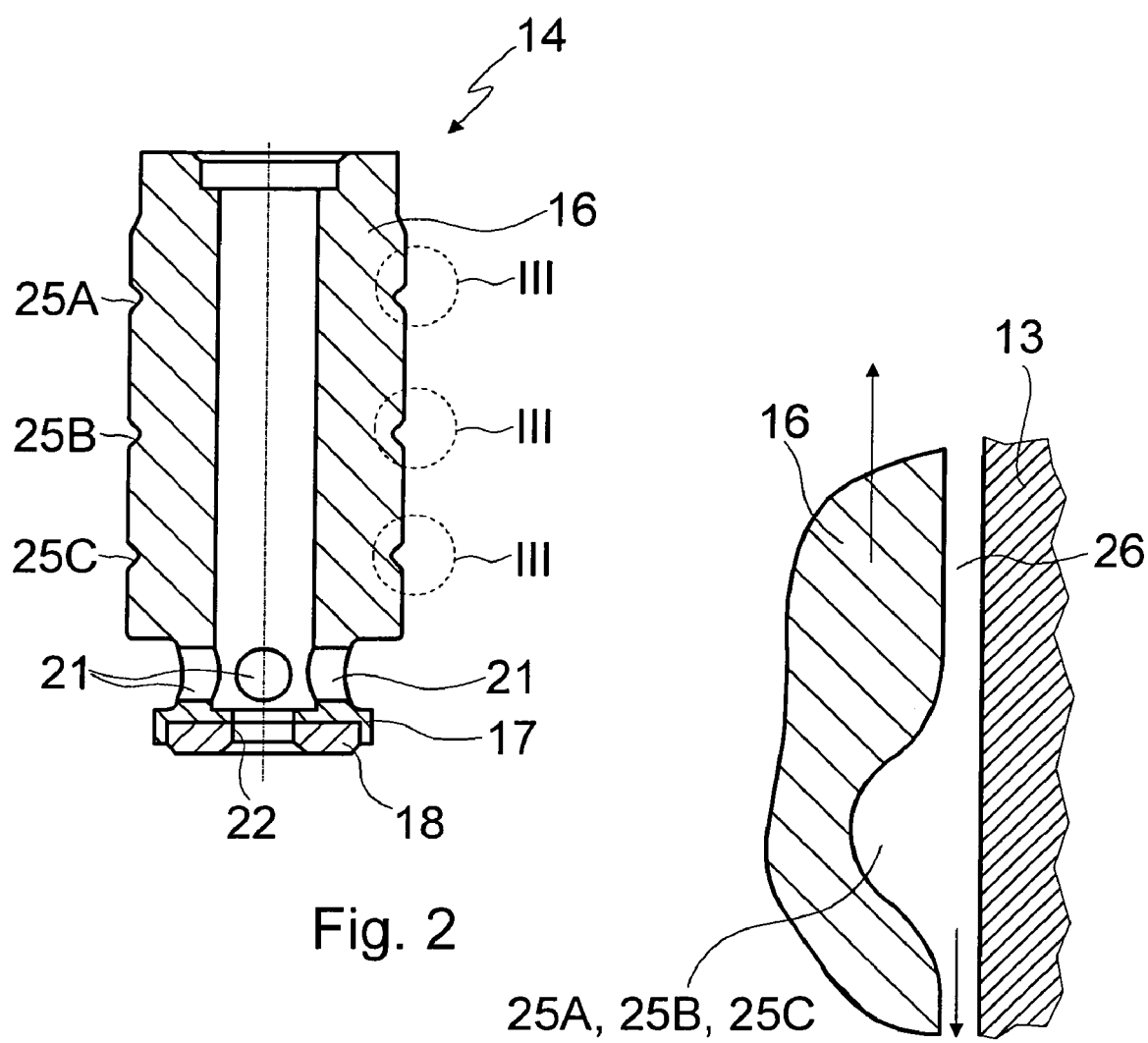

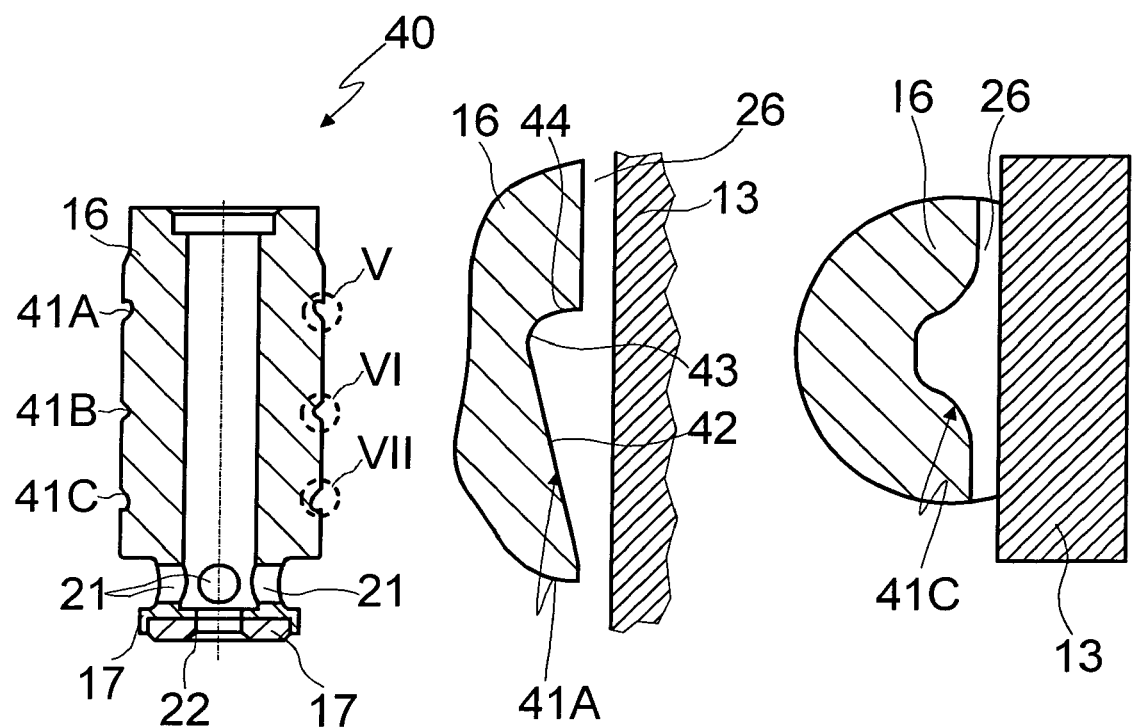
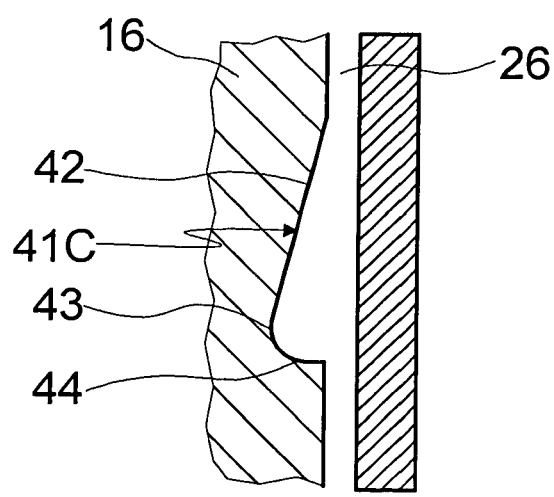
Fig. 4    Fig. 5    Fig. 6
Fig. 7

VALVE FOR CONTROLLING A FLUID

FIELD OF THE INVENTION

The present invention is directed to a valve for controlling a fluid, in particular for controlling a gas.

BACKGROUND INFORMATION

A valve of this type is known from practical experience and is usable as a gas control valve in a fuel cell and/or a gas-powered engine.

A valve of this type includes a valve housing which may have a multipart design, and an electromagnetic actuating unit for a solenoid armature. The solenoid armature is guided axially displaceably in a receptacle of the valve housing having a matching design, and cooperates with a valve seat, so that a fluid stream from an inflow side to an outflow side of the valve is controllable. The solenoid armature is configured as valve-closing element on its end facing the valve seat.

A known valve of this type has the disadvantage—in particular when used to control a dry gas—that material wear may occur in the guide region between the solenoid armature and the valve housing, which may result in failure of the valve functionality.

SUMMARY OF THE INVENTION

The valve according to the present invention for controlling a fluid, in particular for controlling a gas, having at least one lubricant chamber adjacent to a guide gap between the valve housing and the valve armature, has the advantage that a lubricant chamber is formed in the guide region between the valve housing and the valve armature which reduces material wear on the solenoid armature, thereby minimizing the risk of failure caused, for example, by a pronounced tilt of the solenoid armature resulting from high friction.

As a result of the downward and upward motions of the solenoid armature occurring during operation of the valve, the lubricant—which is a grease or a paste in particular—contained in the lubricant chamber is applied in the guide gap between the solenoid armature and the valve housing, and is distributed evenly. The lubricant not only reduces the friction in the guide region of the solenoid armature, but, due to a squeezed film flow, increases the pressure in the guide gap at the points where the solenoid armature tilts. Guidance of the armature is stabilized as a result of the latter effect, so that jamming of the solenoid armature in the valve housing is effectively prevented.

The valve according to the present invention is particularly suited to controlling the mass flow of gases such as hydrogen and natural gas, and it can be used with a fuel cell and/or an auxiliary power unit (APU) and/or with a gas-powered engine of a motor vehicle.

In a preferred embodiment of the valve according to the present invention, the at least one lubricant chamber is formed by an annular groove on the circumference of the solenoid armature. A lubricant chamber situated in this manner may be filled conveniently with a consistent lubricant before the solenoid armature is installed in the valve housing.

To achieve good distribution of the lubricant contained in the lubricant chamber, the annular groove is rounded on at least one, and preferably both, edges, so that a sufficient quantity of the lubricant is introduced into the guide gap between the valve housing and the solenoid armature and is distributed there as a result of the capillary effect in the narrowing gap during the upward and downward motions of the solenoid armature. During the upward motion, the lubricant pressure increases in the annular groove at the flank facing away from the direction of motion; as a result, the lubricant is introduced into the guide gap via the aforementioned, rounded edge in the direction opposite the direction of motion. During the downward movement of the solenoid armature, the lubricant is similarly introduced into the guide gap via the other rounded edge of the annular groove.

To prevent the lubricant contained in the lubricant chamber from leaking into a gas controlled by the valve, i.e., to prevent a loss of lubricant due to lubricant leaking out of the guide gap, a lubricant chamber designed as an annular groove and situated close to one of the front sides of the solenoid armature may be designed with a flank that faces the respective front face, and is oriented substantially at a right angle to the axis of the solenoid armature and has a sharp edge representing a leakage barrier. In particular, the annular groove may then have a nose-shaped cross section.

BRIEF DESCRIPTION OF THE DRAWINGS

FIG. 2 shows a solenoid armature of the valve according to FIG. 1 by itself.

FIG. 3 shows an enlarged depiction representing each of the areas labeled with reference numeral III and circled with dashed lines in FIG. 2.

FIG. 4 shows a solenoid armature of a second embodiment of a valve according to the present invention.

FIG. 5 shows a schematic, enlarged depiction of region V circled with dashed line in FIG. 4.

FIG. 6 shows a schematic, enlarged depiction of region VI circled with dashed line in FIG. 4.

FIG. 7 shows a schematic, enlarged depiction of region VII circled with dashed line in FIG. 4.

DETAILED DESCRIPTION

Figure 1:
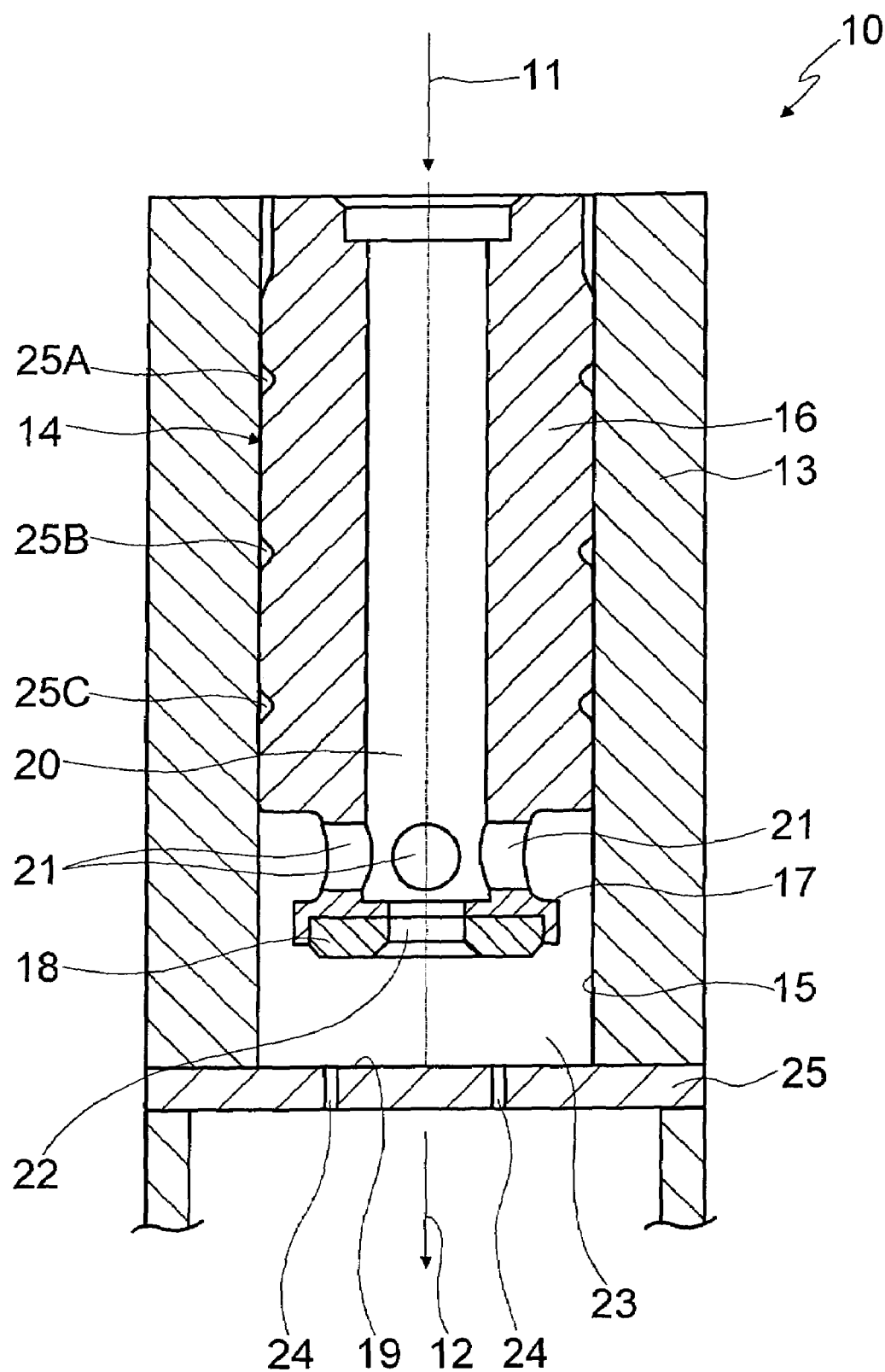
FIG. 1 shows a simplified longitudinal section through a gas valve in a localized view.

A gas valve 10 is shown in FIG. 1 which is designed for use in a fuel cell or a gas-powered engine of a motor vehicle and which is used for controlling a flow of hydrogen or NG (natural gas) from an inflow side 11 to an outflow side 12.

Gas valve 10 includes a valve housing 13 which has a multipart design and accommodates a solenoid coil (not shown) which is used for actuating a solenoid armature 14 which is guided in a longitudinally (axially) displaceable manner in a cylindrical recess 15 of valve housing 13.

Solenoid armature 14 is designed essentially in the shape of a tube and has a cylindrical region 16 through which it is guided in receptacle 15 of valve housing 13 and which is adjacent to a region 17 designed as a valve-closing member having a smaller diameter which cooperates with a valve seat 19 via an elastomer seal 18 situated on the front face.

Solenoid armature 14 further includes an axially oriented internal space 20 which connects inflow side 11 of valve 10 with four radial outflow holes 21 and an axial outflow hole 22. Outflow holes 21 and 22 lead to a pressure chamber 23 of valve 10 which, when valve-closing member 17 is open, connects outflow openings 24 in a valve plate 25 with outflow side 12, so that the corresponding gas is able to flow from inflow side 11 to outflow side 12 of valve 10.

As shown in FIGS. 2 and 3 in particular, solenoid armature 14 has three annular grooves 25A, 25B and 25C on the circumference of cylindrical region 16, which represent lubricant chambers, using which lubricant may be introduced into a guide gap 26 located between cylindrical region 16 of solenoid armature 14 and valve housing 13.

Each of the annular grooves 25A, 25B, 25C used as lubricant reservoirs and shown in detail in FIG. 3 has a cross section that is modeled after the shape of a Gaussian distribution, has rounded edges and, thus, a symmetrical configuration.

Due to the design of annular grooves 25A, 25B, 25C—each having rounded edges—lubricant is introduced intensively into guide gap 26 due to the nozzle effect when solenoid armature 14 moves up and down during operation.

In the present case, solenoid armature 14 is guided along a long guide in the valve housing which extends substantially over the entire length of cylindrical region 16. Alternately, solenoid armature 14 may also be guided over two short guides designed in the shape of a collar in valve housing 13, in which case a lubricant chamber of the type shown in detail in FIG. 3 may be formed in each of the short guides.

The design of an alternative embodiment of solenoid armature 40 of a gas valve of the type shown in FIG. 1 is shown in FIGS. 4 through 7. Solenoid armature 40 largely corresponds to the solenoid armature shown alone in FIG. 2, although it differs from it in that it includes three annular grooves 41A, 41B and 41C, each used as a lubricant chamber but having different cross sections. For example, annular groove 41A, which is located close to the front face of cylindrical region 16 facing away from valve-closing member 17 and shown enlarged in FIG. 5, has a cross section which forms a ramp-like region 42 forming the flank of annular groove 41A facing valve-closing member 17, an arched transition region 43, and a flank region 44 forming a sharp edge which is oriented essentially at a right angle to the axis of solenoid armature 16 and, therefore, essentially at a right angle to guide gap 26 located between solenoid armature 16 and valve housing 13. Annular groove 41A thus has an essentially nose-shaped cross section.

Annular groove 41C, shown in an enlarged view in FIG. 7, which is located close to the front face of cylindrical region 16 facing valve-closing member 17, has a cross section which is a mirror image to the cross section of annular groove 41A and, consequently, also includes a ramp region 42, an arched transition region 43, and a flank region 44 forming a sharp edge and oriented at a right angle to guide gap 26.

Annular groove 41B shown in an enlarged view in FIG. 6 has a symmetrical cross section which essentially corresponds to that of the annular grooves of the solenoid armature in FIG. 2 and is therefore modeled after a Gaussian distribution.

What is claimed is:

1. A valve for controlling a fluid, the valve having an inflow side and an outflow side, the valve comprising:
    a valve-closing member;
    a valve seat;
    a valve housing;
    an electromagnetic actuating unit for a solenoid armature which is accommodated by the valve housing, which is guided axially displaceably in the valve housing and which cooperates with the valve seat via the valve-closing member, in such a way that a fluid stream from the inflow side to the outflow side of the valve is controllable; and
    at least one lubricant chamber situated adjacent to a guide gap between the valve housing and the solenoid armature;
    wherein the at least one lubricant chamber is formed by at least one annular groove on a circumference of the solenoid armature; and
    wherein the annular groove has a cross-section in the shape of a Gaussian distribution.

2. The valve according to claim 1, wherein the fluid is a gas.

3. The valve according to claim 1, wherein the annular groove is rounded on at least one edge.

4. The valve according to claim 3, wherein the annular groove is rounded on both edges.

5. A valve for controlling a fluid, the valve having an inflow side and an outflow side, the valve comprising:
    a valve-closing member;
    a valve seat;
    a valve housing;
    an electromagnetic actuating unit for a solenoid armature which is accommodated by the valve housing, which is guided axially displaceably in the valve housing and which cooperates with the valve seat via the valve-closing member, in such a way that a fluid stream from the inflow side to the outflow side of the valve is controllable; and
    at least one lubricant chamber situated adjacent to a guide gap between the valve housing and the solenoid armature;
    the at least one lubricant chamber is formed by at least one annular groove on a circumference of the solenoid armature; and
    wherein the at least one annular groove is situated proximate to a front side of the solenoid armature, the annular groove having a flank facing a respective front face, being oriented substantially at a right angle to an axis of the solenoid armature and forming a sharp edge.

6. The valve according to claim 5, wherein the fluid is a gas.

7. The valve according to claim 5, further comprising at least a second and third annular groove on the circumference of the solenoid armature, wherein:
    the second annular groove is a mirror image of the annular groove situated proximate to the front side of the solenoid armature; and
    the third annual groove is rounded on both edges having a cross section in the shape of a Gaussian distribution.

8. The valve according to claim 7, wherein:
    the second annular groove is situated opposite the annular groove situated proximate to the front side of the solenoid armature; and
    the third annual groove is disposed between the annular groove situated proximate to the front side of the solenoid armature and the second annular groove.

9. The valve according to claim 7, wherein the fluid is a gas.

10. A valve for controlling a fluid, the valve having an inflow side and an outflow side, the valve comprising:
    a valve-closing member;
    a valve seat;
    a valve housing;
    an electromagnetic actuating unit for a solenoid armature which is accommodated by the valve housing, which is guided axially displaceably in the valve housing and which cooperates with the valve seat via the valve-closing member, in such a way that a fluid stream from the inflow side to the outflow side of the valve is controllable; and at least one lubricant chamber situated adjacent to a guide gap between the valve housing and the solenoid armature;

wherein the at least one lubricant chamber is formed by at least three annular grooves on a circumference of the solenoid armature, the annular grooves having different cross sections.

11. The valve according to claim 10, wherein the fluid is a gas.

* * * * *